United States Patent
Mora et al.

(10) Patent No.: US 11,890,895 B1
(45) Date of Patent: *Feb. 6, 2024

(54) SEGMENTED WHEEL PROTECTOR

(71) Applicant: 1Lss, Inc, Los Angeles, CA (US)

(72) Inventors: Fernando Mora, Reseda, CA (US);
Alejandro Baca, Sherman Oaks, CA (US); Mydul R. Islam, Los Angeles, CA (US); Kevin H. Vuong, Baldwin Park, CA (US)

(73) Assignee: 1Lss Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,889

(22) Filed: Sep. 26, 2023

Related U.S. Application Data

(63) Continuation-in-part of application No. 18/156,383, filed on Jan. 18, 2023.

(51) Int. Cl.
*B60B 7/01* (2006.01)
*B60B 7/06* (2006.01)

(52) U.S. Cl.
CPC .............. *B60B 7/01* (2013.01); *B60B 7/06* (2013.01); *B60B 2310/318* (2013.01); *B60B 2360/30* (2013.01)

(58) Field of Classification Search
CPC .......... B60B 7/01; B60B 7/06; B60B 2360/30
See application file for complete search history.

(56) References Cited

U.S. PATENT DOCUMENTS

| | | | |
|---|---|---|---|
| 3,891,276 A | 6/1975 | Spisak | |
| 3,999,268 A | 12/1976 | Jacobs | |
| 5,273,345 A | 12/1993 | Baccman | |
| 7,448,694 B1 | 11/2008 | Bentley | |
| 7,784,877 B1 | 8/2010 | Castillo | |
| D635,082 S | 3/2011 | Scott | |
| 8,459,752 B2 | 6/2013 | Russell | |

(Continued)

FOREIGN PATENT DOCUMENTS

| EP | 1939012 | 7/2008 |
|---|---|---|
| WO | 19197751 | 10/2019 |
| WO | 20025867 | 2/2020 |

OTHER PUBLICATIONS

MXA Team Tested: Motion Pro Rim Shield, Motocross Action Magazine https://motocrossactionmag.com/mxa-team-tested-motion-pro-rim-shield/ May 1, 2012.

(Continued)

*Primary Examiner* — Scott A Browne
(74) *Attorney, Agent, or Firm* — Thomas Coester Intellectual Property

(57) ABSTRACT

A protector for a wheel is formed from a plurality of segments. Each segment is formed from a synthetic material and has an arcuate distal edge of a first radius, the distal edge forming a lip to engage a distal edge of the wheel. Each segment has at least two spoke adjacent edges and an arcuate proximal edge with a second radius less than the first radius. In some embodiments, the proximal edge defines a hook to engage an inner recess of the wheel. Each spoke adjacent edge is configured to reside near a spoke of the wheel during use. In some embodiments, a protrusion extended from the lip serves as a pinch point when a tire deforms during an impact event.

17 Claims, 16 Drawing Sheets

(56) References Cited

U.S. PATENT DOCUMENTS

| | | |
|---|---|---|
| 9,140,525 B2 | 9/2015 | Yakoub |
| 10,207,547 B2 | 2/2019 | Rieger |
| 10,596,849 B2 | 3/2020 | Boucher |
| 11,383,551 B2 | 7/2022 | Kapoor |
| 2007/0120415 A1 | 5/2007 | Kang |
| 2009/0302670 A1 | 12/2009 | Flynn |
| 2011/0193401 A1 | 8/2011 | Scott |
| 2015/0008724 A1 | 1/2015 | Wurft |
| 2016/0288564 A1* | 10/2016 | Ishikawa ................ B60B 7/063 |
| 2018/0065407 A1* | 3/2018 | Heck .................... B60B 7/0086 |

OTHER PUBLICATIONS

Tesla Model X aerodynamic inserts at least as early at Nov. 30, 2022.

* cited by examiner

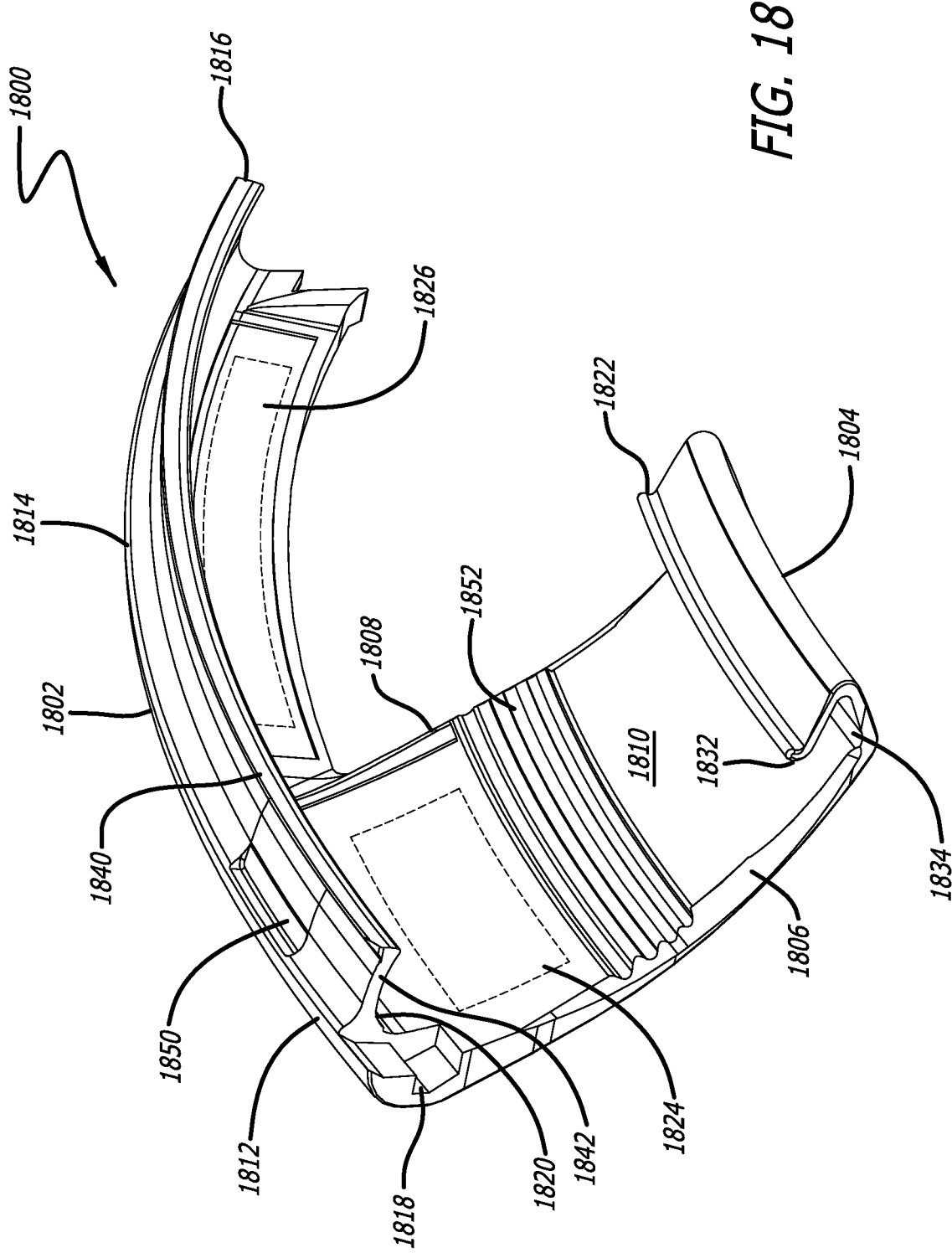

SEGMENTED WHEEL PROTECTOR

CROSS REFERENCE TO RELATED APPLICATIONS

This application is a continuation in part of U.S. application Ser. No. 18/156,383 filed Jan. 18, 2023 entitled SEGMENTED WHEEL PROTECTOR.

BACKGROUND

Technological Field

Embodiments of the invention relate to a wheel protector. More specifically, embodiments of the invention relate to a segmented wheel protector that is easy to install.

Background

Wheels made of aluminum or other metals get scratched and can be very expensive to replace/repair. Commonly existing wheel protectors negatively impact the look of the wheels and can be difficult to install and remove. What is needed is an attractive low-cost wheel protector that can be easily installed.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 18 is a rear perspective view of a segmented wheel protector according to another alternative embodiment of the invention.

DETAILED DESCRIPTION

Figure 1:
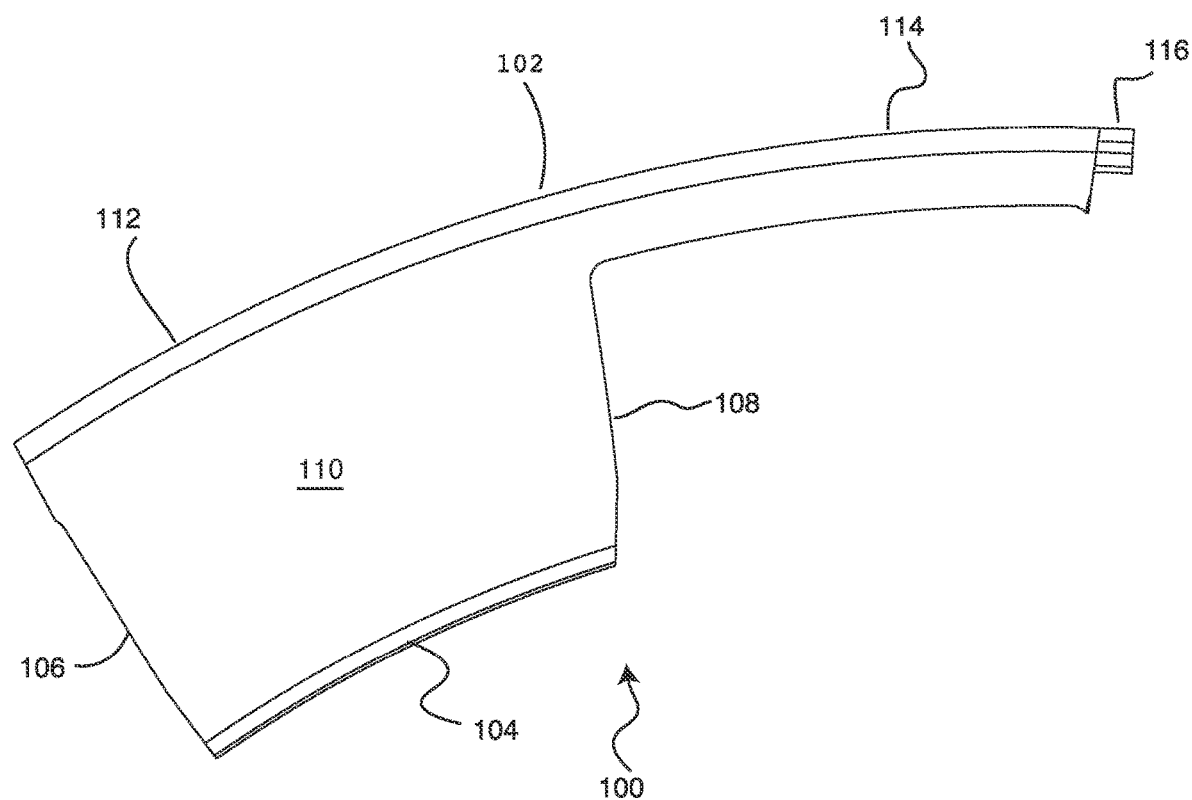
FIG. 1 is a front view of a segment of a segmented wheel protector according to one embodiment of the invention.

Embodiments of the invention provide a segmented wheel protector for an automobile wheel. Some embodiments have one segment for each spoke on the wheel. At least one segment may accommodate a valve stem for a tire on the wheel. In some embodiments individual segments can be replaced independently of the other segments that collectively protect the wheel.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

FIG. 1 is a front view of a segment of a segmented wheel protector according to one embodiment of the invention. The segmented wheel protector uses a plurality of segments 100 to protect the rim of the wheel from curb rash and other impact related damage that is both unsightly and expensive to repair. The segments 100 also have the advantage of concealing preexisting damage to the wheel. In the shown embodiment, each segment 100 has an arcuate distal edge 102 with a radius only slightly larger than the radius of the wheel on which it is intended to be used. The segment 100 also has an arcuate proximal edge 104 with a radius less than the radius of the distal edge 102. As used herein "distal" and "proximal" when modifying "edge" refer to position relative to the axle of the wheel when the segment is installed.

Distal edge 102 forms a lip (shown in FIG. 3) that, in use, engages the rim of the wheel to hold the segment 100 in place. Distal edge 102 has an interspoke section 112 and an over spoke section 114. The over spoke section 114 terminates in a tapered end 116 configured to underlie an interspoke section of an adjacent segment when installed. Proximal edge 104 defines a hook 222 (better shown in FIG. 3) that engages an inner wheel recess to retain the segment 100 on the wheel.

To install a segment 100, hook 222 is first engaged in the inner wheel recess between a pair of adjacent spokes. Then the lip 220 is snapped over the rim of the wheel. The snap fit ensures easy installation and secure retention of the segment 100. Subsequent segments are snapped in place with the respective notch 216 of the current segment 100-$n$+1 overlying the tapered end 116 of the immediately adjacent segment 100-$n$. For the final segment the tapered end 116 of segment 100 is inserted beneath its prospective adjacent segment before the lip is snapped over the rim and tapered end of the other immediately adjacent segment.

The segment 100 has a first spoke adjacent edge 106 and a second spoke adjacent edge 108. The body 110 of the segment 100, when installed resides between two spokes of a wheel such that the spoke adjacent edges near two immediately adjacent spokes. As used herein "near" is deemed to mean reside within 0-7 mm of. In some embodiments, body 110 has a surface profile that closely matches the profile of the underlying wheel. In some embodiments there are an equal number of spokes and segments 100. In some embodiments all segments 100 are substantially identical except one that differs only in that it defines a bore (not shown in this drawing) to accommodate a valve stem of a tire on the wheel.

Segment 100 may be formed of polycarbonate, acrylonitrile butadiene styrene (ABS), or other suitable synthetic materials. ABS has desirable strength and flexibility characteristic for use as a wheel protector. ABS can be produced in different colors easily. Segment 100 may be injection molded or otherwise formed as a single integral unit. In some embodiments, the ABS may be painted or coated to more closely match the color to the wheel on which it will be used or any desired color. In other embodiments colorant may be added during molding so that the segment 100 has a desired color without further processing. By matching the color of the wheel, the segments remain unobtrusive. Some users may instead want to dress up their wheels with more vibrant colors. Any coloration is deemed within the scope of embodiments of the invention.

Figure 2:
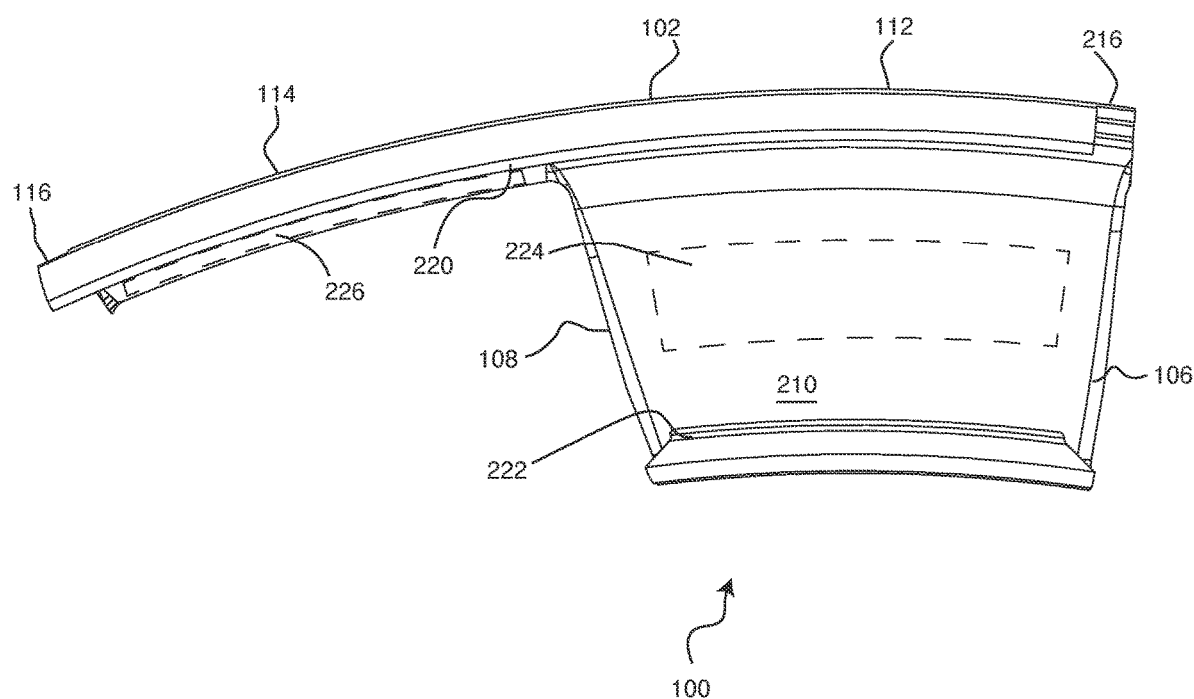
FIG. 2 is a rear view of a segment of a segmented wheel protector according to one embodiment of the invention.

FIG. 2 is a rear view of a segment of a segmented wheel protector according to one embodiment of the invention. In this view, the lip 220 can be seen. Distal edge 102 also defines a receiving notch 216 that receives tapered end 116 of an adjacent segment when installed. In some embodiments the tapered end 116 and the notch 216 may be omitted with segments merely abutting the edge of each neighboring segment. But the male/female interconnection of the tapered end 116 and notch 216 increase the structural stability of embodiments where it exists. Furthermore, they accommodate less rigid manufacturing tolerances.

In some embodiments, the wheel facing surface 210 may have an adhesive region 224 thereon to further secure the segment when installed. Some embodiments may have an additional adhesive region 226 within the over spoke section 114. One embodiment uses VHB-5925 double sided foam tape commercially available from 3M Corporation of St. Paul Minnesota. Foam tape has the advantage of absorbing dimensional differences between the segment 100 and the wheel. Other embodiments may use other pressure sensitive adhesives. The adhesive further cements the segment to the wheel. This is particularly beneficial where multiple impact events may occur to a segment 100 before the segment 100, or the whole wheel protector is replaced. Testing has shown that with adhesive layer a segment cracked or damaged by an impact event will generally remain on the wheel.

Figure 3:
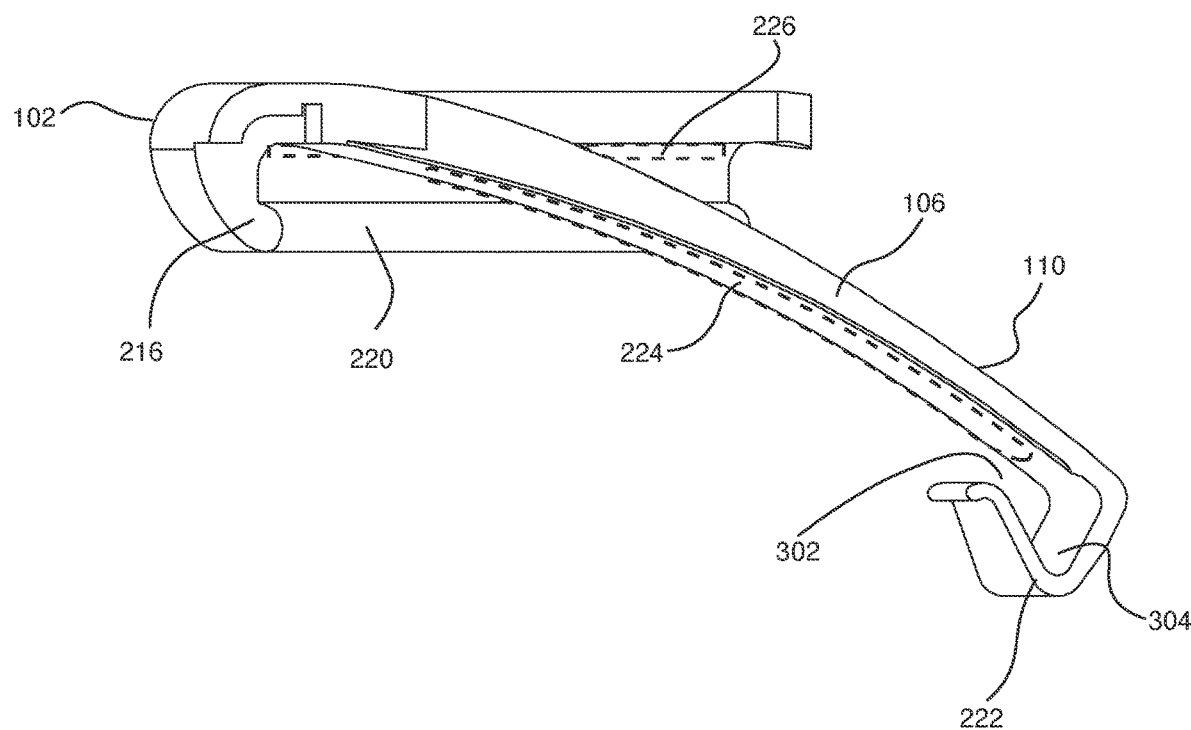
FIG. 3 is a profile view of a segment of a segmented wheel protector according to one embodiment of the invention.

FIG. 3 is a profile view of a segment of a segmented wheel protector according to one embodiment of the invention. In this view hook 222 is readily visible. In some embodiments, hook 222 has a relatively narrow mouth 302 and a wider bottom 304. This allows the hook 222 to better engage the inner recess of the wheel. The mouth width is selected to be slightly smaller than the proximal interspoke thickness of the wheel. The depth of the hook (distance from mouth to bottom) is selected to accommodate manufacturing variance in wheel. Wheel geometries for the same types of wheels can vary by as much as 5 mm. The resilience of the mouth and the hook depth accommodates these variances and provides firm engagement.

Having the external profile of the body 110 match the wheel profile improves the visual appearance of the installed wheel protector. It also reduces possible negative aerodynamic consequences that might otherwise occur. While not visible once installed, having the internal wheel facing surface 210 with a profile matching the profile of the wheel improves adhesion when an adhesive region 224 is provided.

Figure 4:
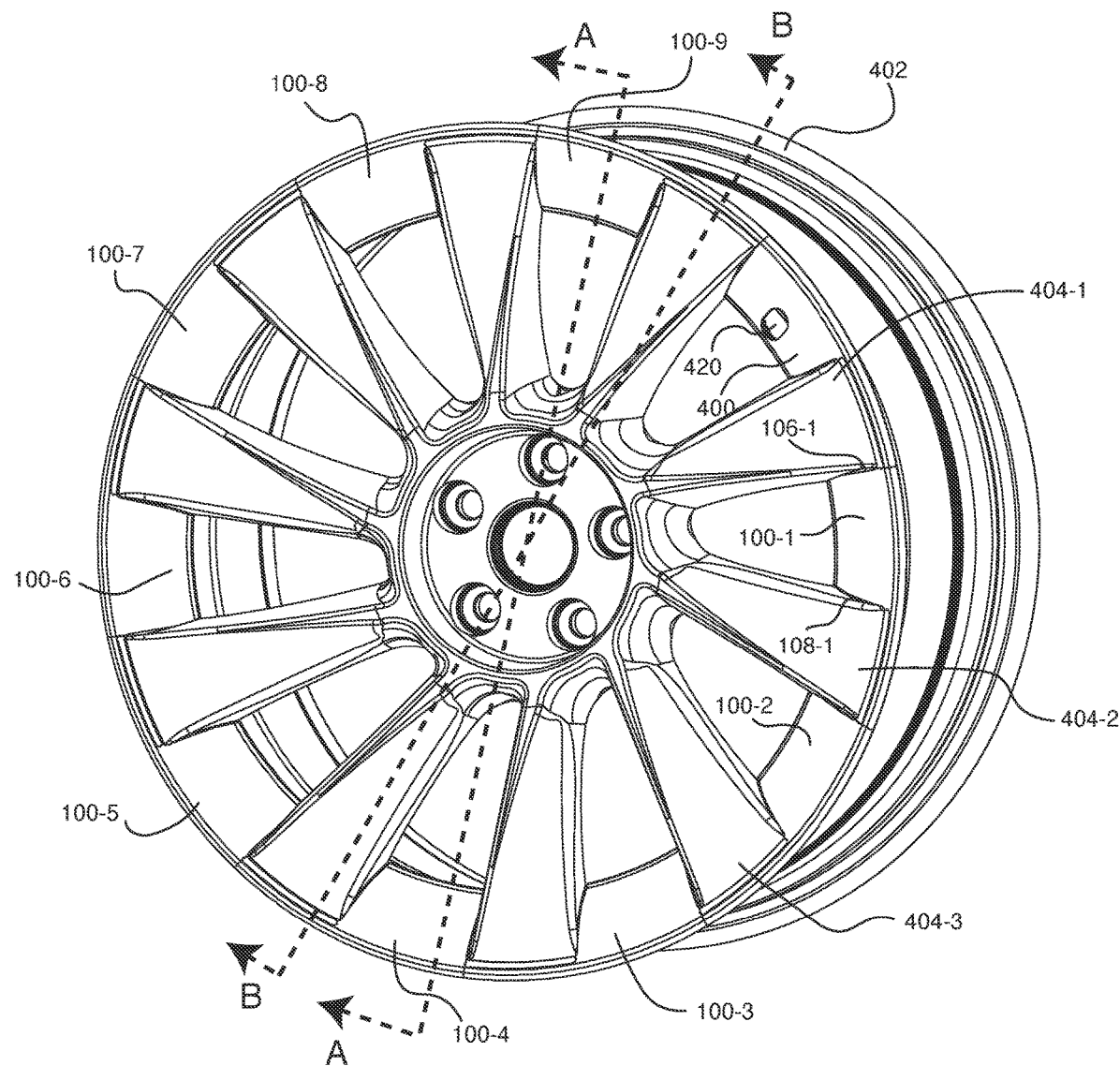
FIG. 4 is a perspective view of a wheel with the segmented wheel protector installed according to one embodiment of the invention.

FIG. 4 is a perspective view of a wheel with the segmented wheel protector installed according to one embodiment of the invention. Wheel 402 has a plurality of spokes e.g. spokes 404-1, 404-2, 404-3, in this case ten. There are ten segments 100-1 through 100-9 (generically segment 100) and valve segment 400 that collectively cover the whole circumference of the wheel 402. All the segments are substantially identical except valve segment 400 which differs from the others only in that it defines a bore 420 to accommodate a valve of a tire (not shown) on the wheel 402. While an embodiment may use all identical segments each accommodating a valve stem, the single valve segment 400 is believed to provide a more aesthetically pleasing appearance. Some wheel models may not require any segment to accommodate the valve stem.

In some embodiments, segments may be formed by molding plural segments 100 as a single integral unit. For example, in some embodiments, segment 100-1 and 100-2 could be molded as a single unit that spanned two spoke, or segments 100-1, 100-2 and 100-3 could be unitarily molded as a segment spanning three spokes. Generally, a larger number of segments facilitates installation of the protector on a wheel.

Each segment 100-n has a body that resides between two adjacent spokes 404-n and 404-m e.g., body 110-1 resides between spoke 404-1 and spoke 404-2. As used herein adjacent spokes are immediately neighboring spokes, for example spoke 404-1 is adjacent to spoke 404-2 but not spoke 404-3. Adjacent edges 106-1 and 108-1 of segment 100-1 reside near and preferably abut spokes 404-2 and spokes 404-1 respectively. When an impact event occurs, e.g., brushing against a curb, the impacted segment 100 absorbs the impact and transfers some of the lateral force to the adjacent spokes. As a result, the segment remains in place with less force required by the hook 222 and lip 220 engagement of the wheel 402.

While wheel 402 has a uniform spoke pattern that allows all segments 100 to be substantially identical, some wheels have spoke patterns where e.g., spoke pairs are relatively close together and separated by greater space from other spoke pairs. Therefore, in some embodiments adjacent segments may be significantly different geometrically to accommodate differing spoke patterns.

Figure 5:
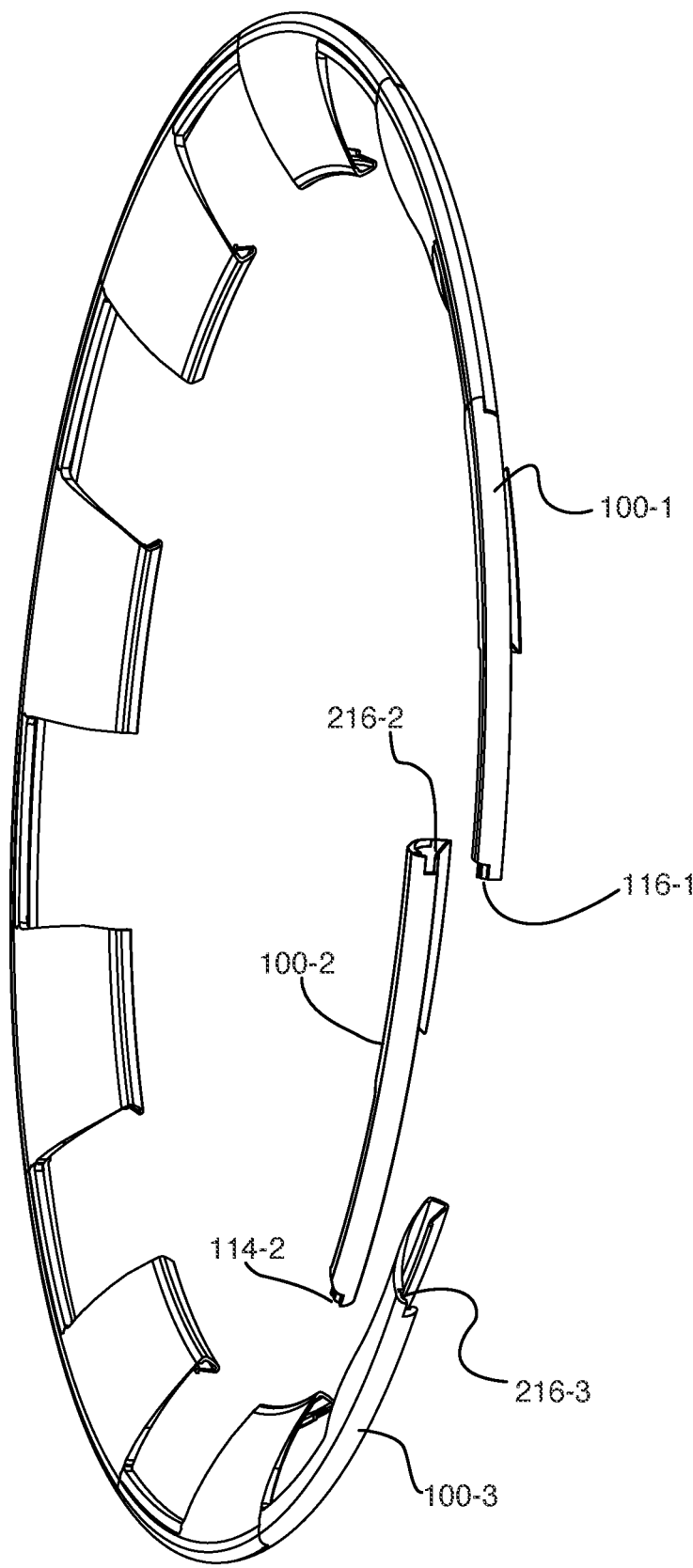
FIG. 5 is a side perspective view of a partially assembled wheel protector according to one embodiment of the invention.

FIG. 5 is a side perspective view of a partially assembled wheel protector according to one embodiment of the invention. The wheel is not shown in this figure for clarity. In FIG. 5, the overlapping relation of adjacent segments 100 is shown. To add the final segment 100-2, tapered end 116-2 is inserted to reside in notch 216-3 of adjacent segment 100-3. Notch 216-2 then overlies tapered end 116-1 of the other adjacent segment 100-1. The interleaving of taper ends and notches is repeated around the circumference of the protector.

Figure 6A:
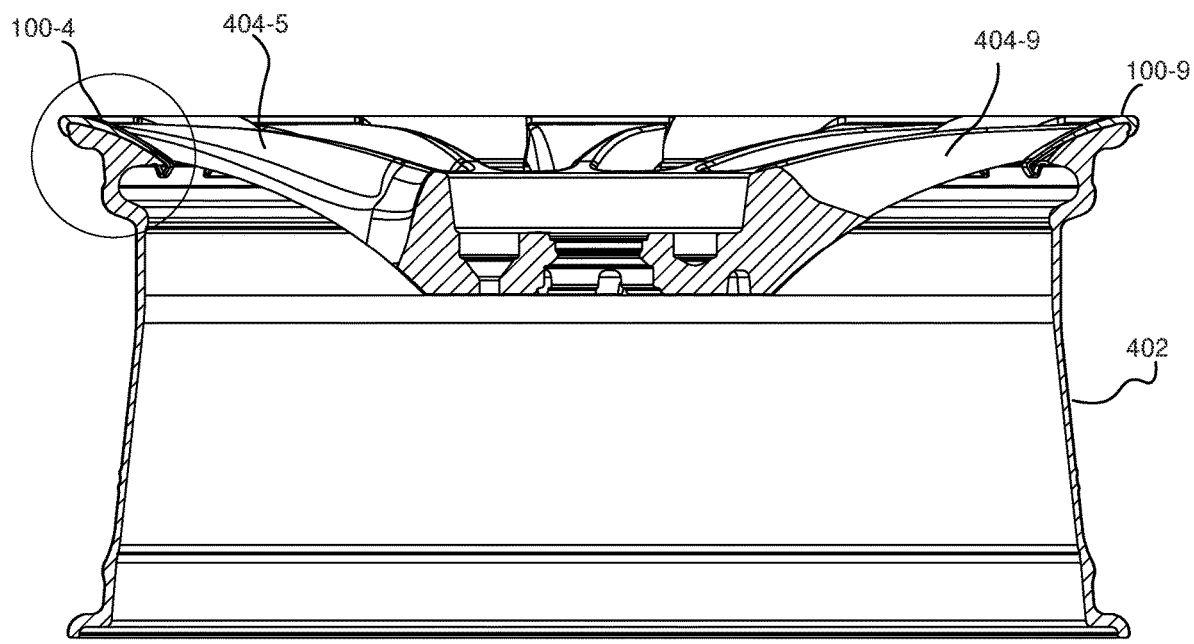
FIG. 6A is a sectional view for FIG. 4 taken through section A-A.
Figure 6B:
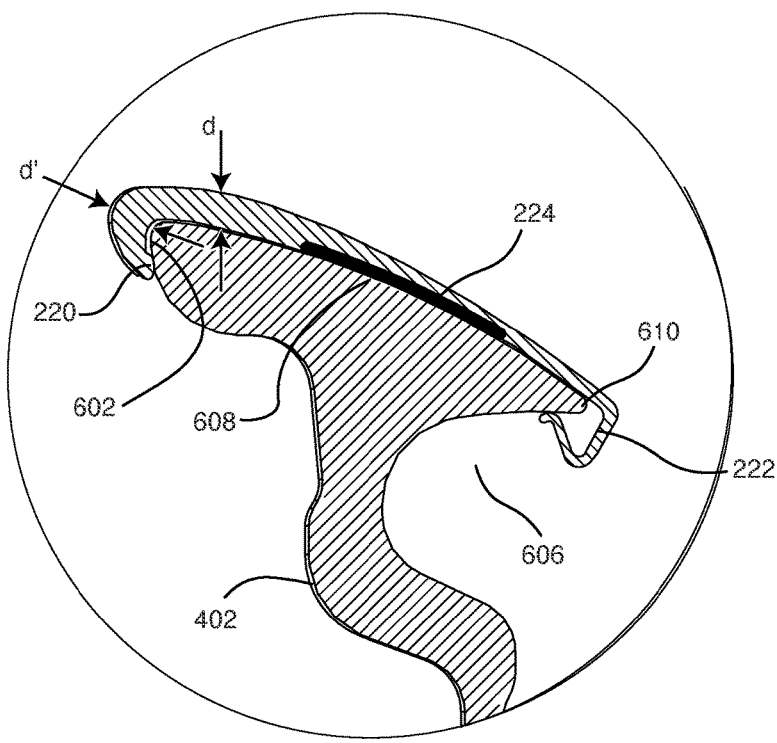
FIG. 6B is an enlargement of the circled portion of FIG. 6A.

FIG. 6A is a sectional view for FIG. 4 taken through section A-A. FIG. 6A shows the relationship between the interspoke portion of segment 100-4 and the rim 602 of wheel 402. FIG. 6B is an enlargement of the circled portion of FIG. 6A. Hook 222 clamps to the wheel with the free end of the hook residing in inner recess 606 of wheel 402. Lip 220 of distal edge 102 snap fits over the rim 602 of the wheel 402. The rim edge 602 rolls off in an arc. To remain firmly attached lip 220 must snap in below edge 602. That is the distal edge 102 extends marginally further from the axis of rotation of the wheel than edge 602 and lip 220 engages the wheel 402 nearer the axis of rotation than edge 602. The elastic properties of the material forming the segment, e.g., polycarbonate, ensure a stable attachment. An additional adhesive layer 224 adheres to interspoke wheel surface 608 and further cements the segment 100-4 to the wheel 402.

There are two areas that are most likely to be damaged in an impact event. The segment 100 is formed to have a thickness d and d' in these two areas. D' is generally fractionally greater than d. In one embodiment both d and d' are in the range of 2-7 mm. In one embodiment both d and d' are in the range of 3-5 mm.

Figure 7A:
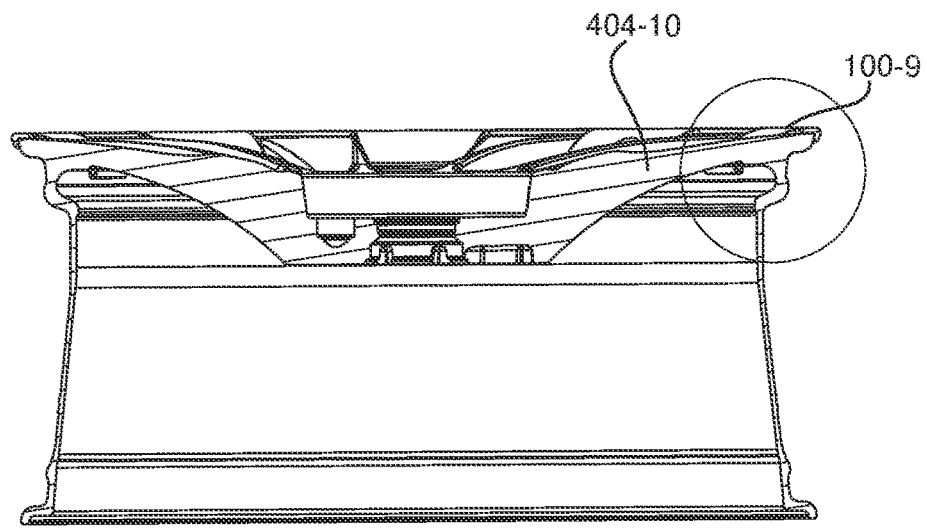
FIG. 7A is a sectional view for FIG. 4 taken through section B-B.
Figure 7B:
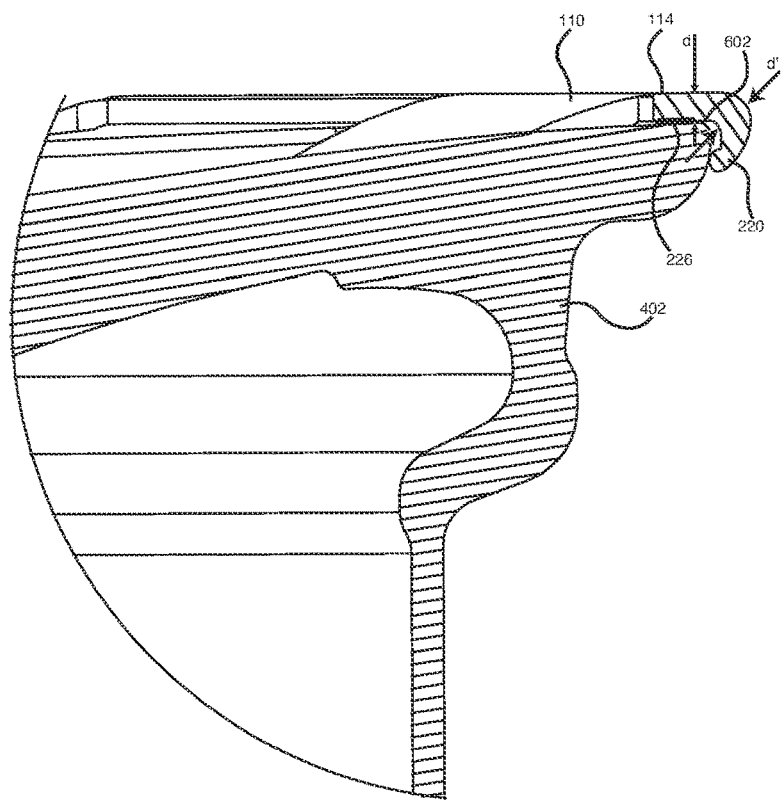
FIG. 7B is an enlargement of the circled portion of FIG. 6A.

FIG. 7A is a sectional view for FIG. 4 taken through section B-B. FIG. 7A shows the relationship between the over spoke portion of segment 100-9 that overlies spoke 404-10 and the rim 602 of wheel 402. FIG. 7B is an enlargement of the circled portion of FIG. 7A. This is analogous in most respects to the discussion of FIG. 6B above. Lip 220 snap fits over the rim 602 of the wheel 402. Once installed lip 220 resides below the distal edge 602 of the wheel 402 and closer to the axis of rotation. The expected areas of impact are protected by a material thickness of d and d'. Additionally, adhesive region 226 adheres to the front distal edge of the wheel in the area where the spoke joins the outer circumference of the wheel. As there is no hook to directly support portion 114, the adhesive region 226 helps to retain this portion on the wheel in the event it is fractured from the remainder of the segment. By holding the fractured portions in place, the adhesive 226 causes the protector to be more effective in the case of subsequent impact events.

Figure 8:
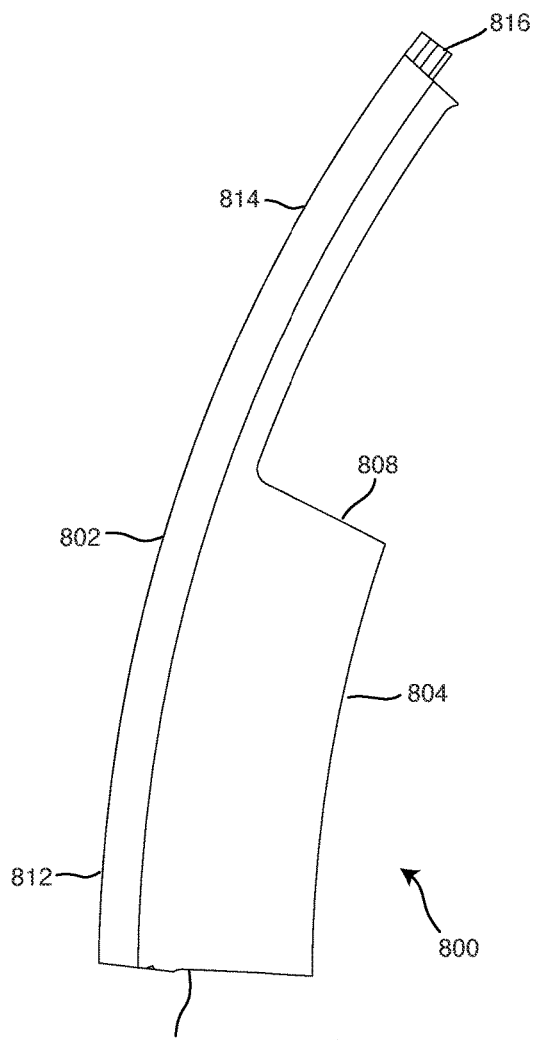
FIG. 8 is a front view of a segment of a segmented wheel protector according to an alternative embodiment of the invention.
Figure 9:
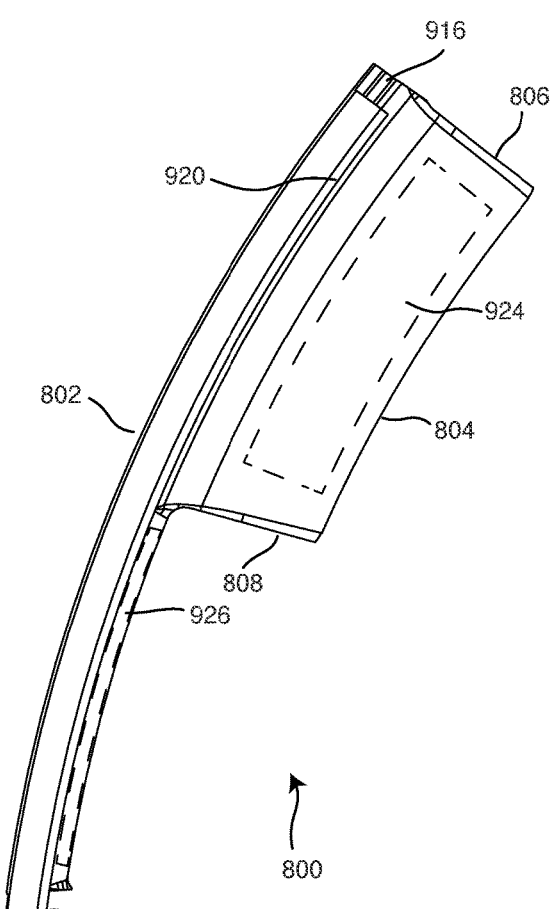
FIG. 9 is a rear view of a segment of a segmented wheel protector according to an alternative embodiment of the invention.
Figure 10:
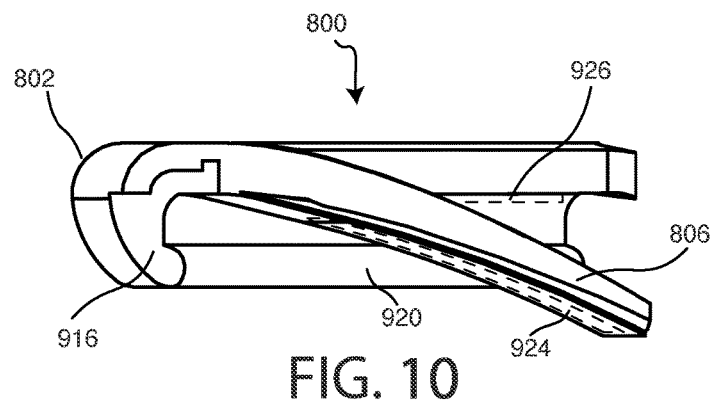
FIG. 10 is a profile view of a segment of a segmented wheel protector according to an alternative embodiment of the invention.

FIGS. 8-10 show a hookless embodiment of the invention. FIG. 8 is a front view of a segment of a segmented wheel protector according to an alternative embodiment of the invention. Segment 800 is substantially the same as the embodiment of FIG. 1 except its proximal edge 804 terminates in a straight or tapered edge that, when installed, resides between two spokes. Segment 800 has two spoke adjacent edges 806, 808 that when installed reside near two facing adjacent spokes. Arcuate distal edge 802 has a radius slightly larger than the wheel on which it will be installed. Distal edge 802 has an interspoke portion 812, and over spoke portion 814 and a tapered end 816.

FIG. 9 is a rear view of a segment of a segmented wheel protector according to an alternative embodiment of the invention. Segment 800 has a lip 920 to engage the distal edged of a wheel. In the absence of an opposing hook, at least one of adhesive regions 924 and 926 is required to hold the segment on the wheel. Segment 800 also defines a notch 916 to overlie a tapered end (816 of an adjacent segment) when installed on a wheel.

FIG. 10 is a profile view of a segment of a segmented wheel protector according to an alternative embodiment of the invention. In the profile view, the absence of the hook is evident. Adhesive region 924 in conjunction with lip 920, in use, couples the segment 800 to the wheel. Notch 916 that receives the tapered end of an adjacent segment is also visible.

Figure 11:
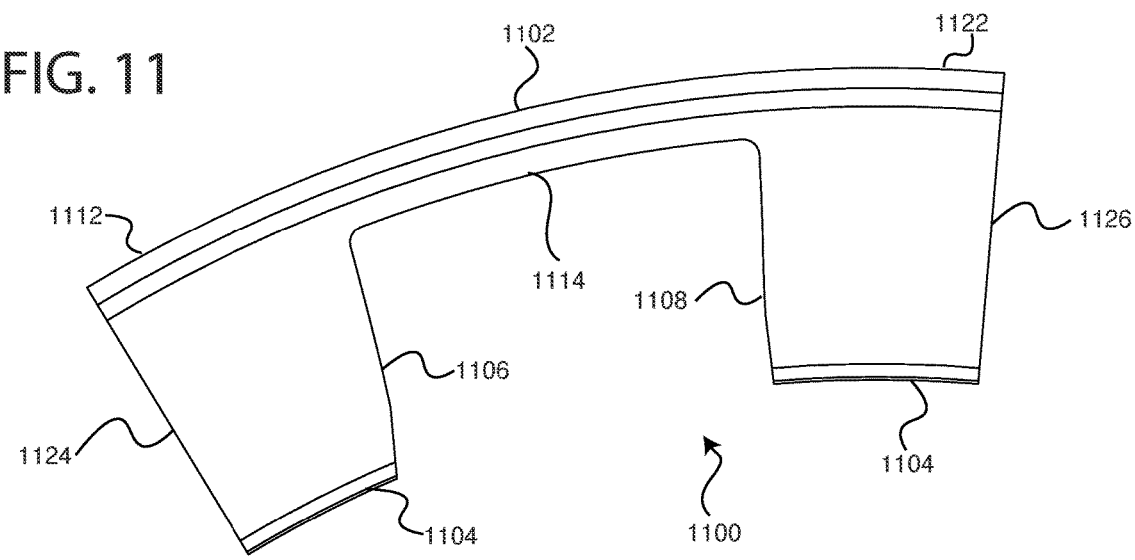
FIG. 11 is a front view of a segment of a segmented wheel protector according to another alternative embodiment of the invention.

FIG. 11 is a front view of a segment of a segmented wheel protector according to another alternative embodiment of the invention. In the shown embodiment, each segment 1100 has an arcuate distal edge 1102 with a radius only slightly larger than the radius of the wheel on which it is intended to be used. Distal edge 1102 has an over spoke section 1114 and two interspoke sections 1112, 1122. Each interspoke section covers approximately half the interspoke distance between two spokes. As such when installed interspoke section 1112 will abut interspoke section 1122 of an adjacent segment to span the entire interspoke distance.

Segment 1100 has two spoke adjacent edges, 1106 and 1108. When installed the spoke adjacent edges 1106, 1108 reside near opposite sides of a single spoke. That is the segment 1100 bridges a spoke. Arcuate proximal edge 1104 is discontinuous to accommodate this bridging. Some embodiments of segment 1100 may also be formed with the tapered end and notch configurations described with reference to other embodiments.

Figure 12:
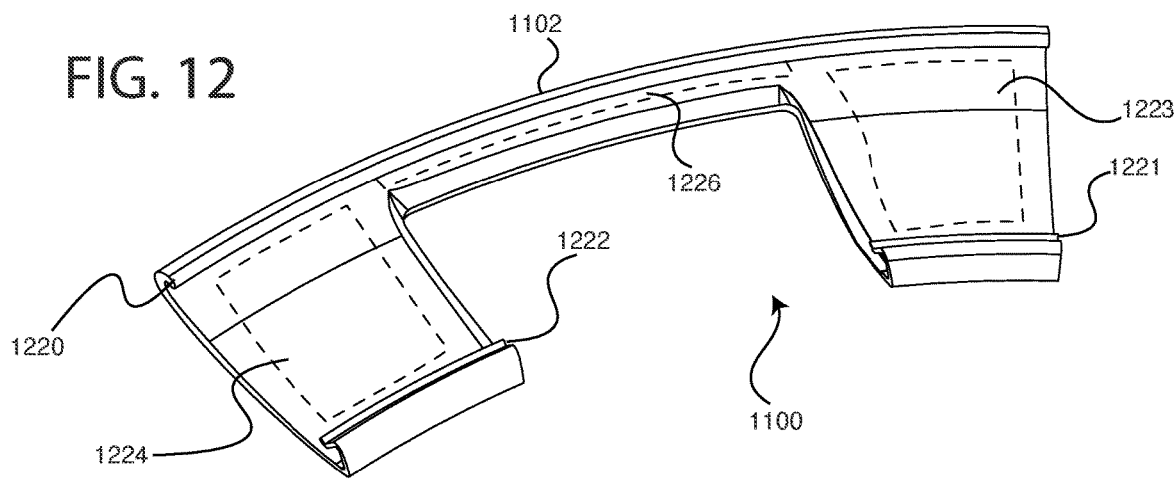
FIG. 12 is a rear view of a segment of a segmented wheel protector according to another alternative embodiment of the invention.

FIG. 12 is a rear view of a segment of a segmented wheel protector according to another alternative embodiment of the invention. In this view, the lip 1220 that, in use, engages the outer rim of the wheel can be seen. Twin hooks 1221, 1222 are formed at the proximal edge 1104 to engage the inner wheel recess on either side of a single spoke. The lip 1220 and hook 1221, 1222 engagement performs as described above with reference to FIGS. 1-7B. In some embodiments, all or some of adhesive regions 1223, 1224 and 1226 may be used to improve the connection with the wheel and improve multiple impact performance of the segment 1100, as described above with reference to other embodiments.

Figure 13:
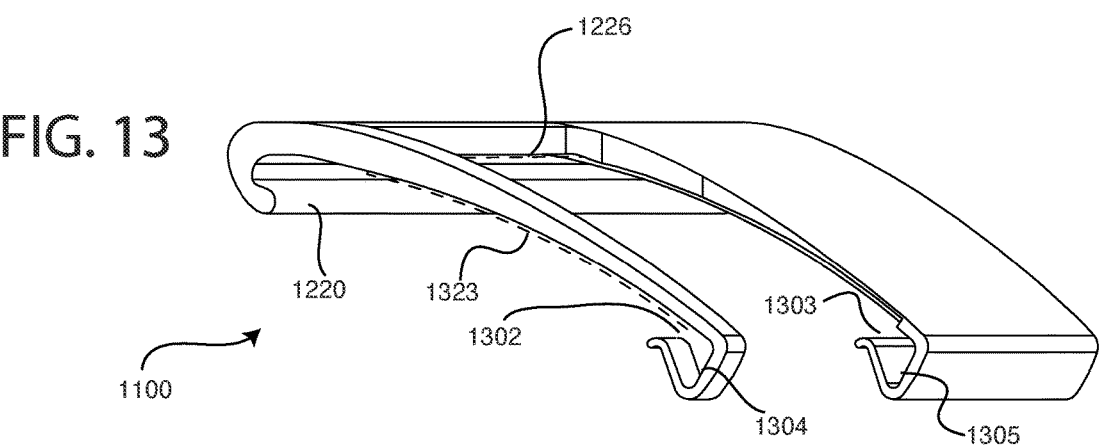
FIG. 13 is a profile view of a segment of a segmented wheel protector according to another alternative embodiment of the invention.

FIG. 13 is a profile view of a segment of a segmented wheel protector according to another alternative embodiment of the invention. In this view, the hook mouths 1302, 1303 and hook bottoms 1304, 1305 are evident. The lip 1220 is also visible in profile.

Figure 14:
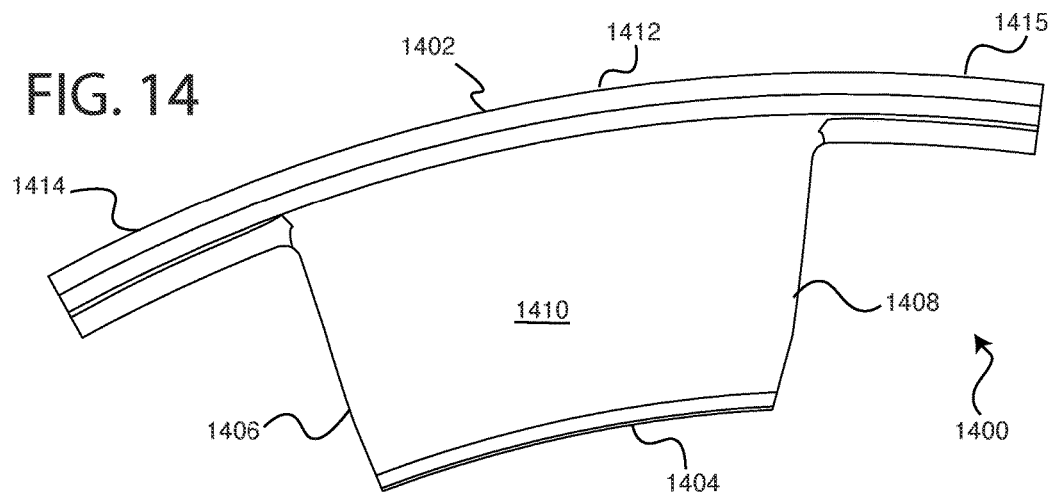
FIG. 14 is a front view of a segment of a segmented wheel protector according to another alternative embodiment of the invention.

FIG. 14 is a front view of a segment of a segmented wheel protector according to another alternative embodiment of the invention. In the shown embodiment, each segment 1400 has an arcuate distal edge 1402 with a radius only slightly larger than the radius of the wheel on which it is intended to be used. Distal edge 1402 has an interspoke section 1412 and two over spoke sections 1414, 1415. Each over spoke section covers approximately half the over spoke distance. As such when installed over spoke section 1414 will abut over spoke section 1415 of an adjacent segment to span the entire overspoke distance.

Segment 1400 has two spoke adjacent edges, 1406 and 1408. When installed the spoke adjacent edges 1406, 1408 reside near facing edges of two adjacent spokes. Arcuate proximal edge 1404 is analogous to proximal edge 104 described with reference to FIGS. 1-3 above. Some embodiments of segment 1400 may also be formed with the tapered end and notch configurations described with reference to other embodiments.

Figure 15:
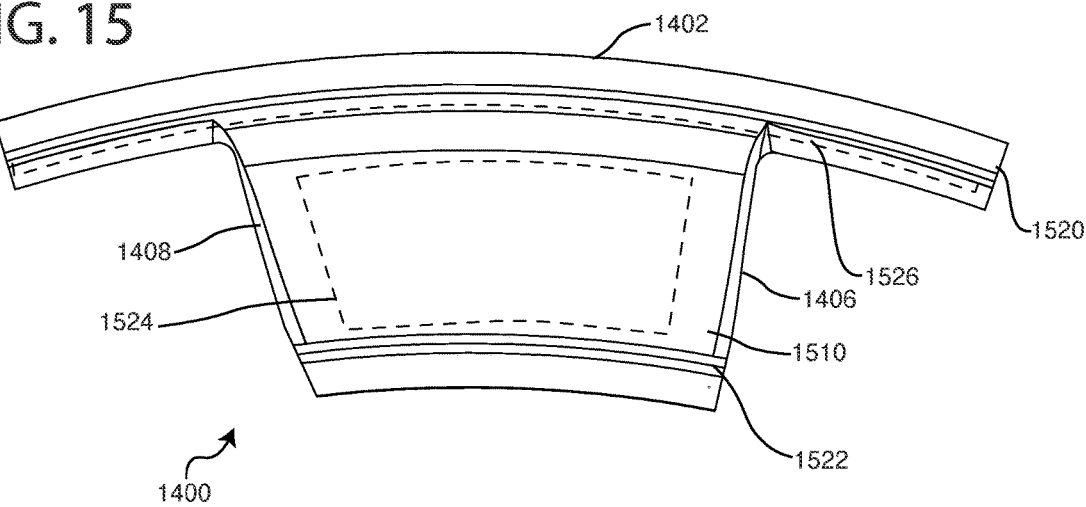
FIG. 15 is a rear view of a segment of a segmented wheel protector according to another alternative embodiment of the invention.

FIG. 15 is a rear view of a segment of a segmented wheel protector according to another alternative embodiment of the invention. In this view, the lip 1520 that, in use, engages the outer rim of the wheel can be seen. Hook 1522 is formed at the proximal edge 1404 to engage the inner wheel recess between two spokes. The lip 1520 and hook 1522 engagement performs as described above with reference to FIGS. 1-7B. In some embodiments, one or both adhesive regions 1524 and 1526 may be used to improve the connection with the wheel and improve multiple impact performance of the segment 1400, as described above with reference to other embodiments.

Figure 16:
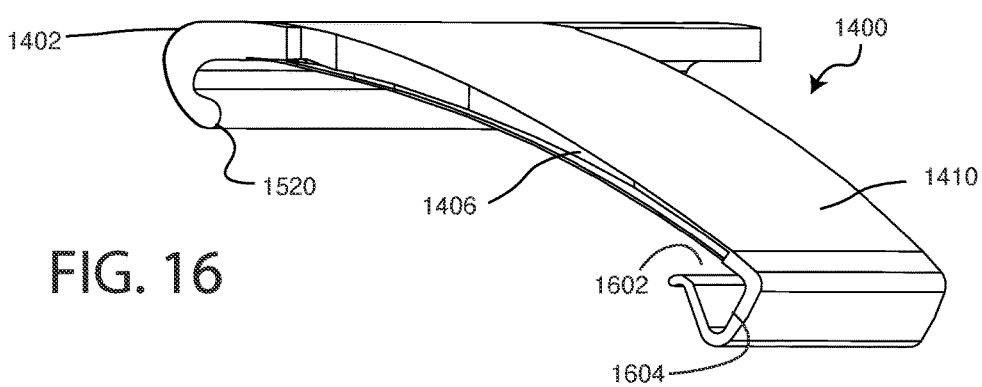
FIG. 16 is a profile view of a segment of a segmented wheel protector according to another alternative embodiment of the invention.

FIG. 16 is a profile view of a segment of a segmented wheel protector according to another alternative embodiment of the invention. In this view, the hook mouth 1602 and hook bottom 1604 are evident. The lip 1520 is also visible in profile.

Figure 17A:
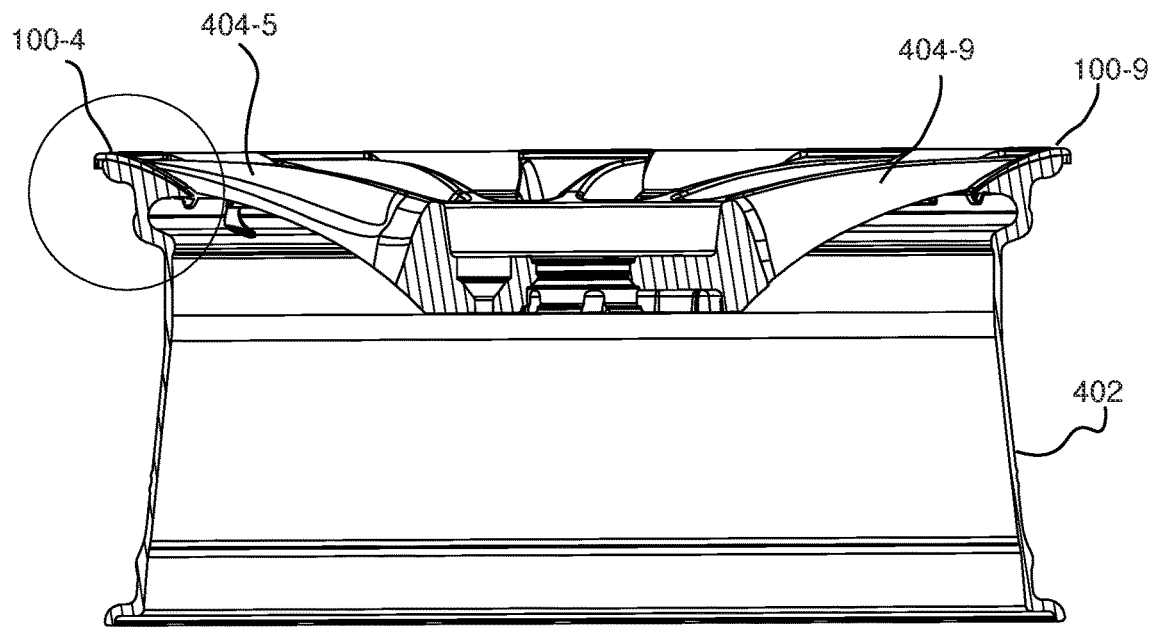
FIG. 17A is a sectional view for FIG. 4 taken through section A-A with an alternative embodiment of the segmented wheel protector installed.
Figure 17B:
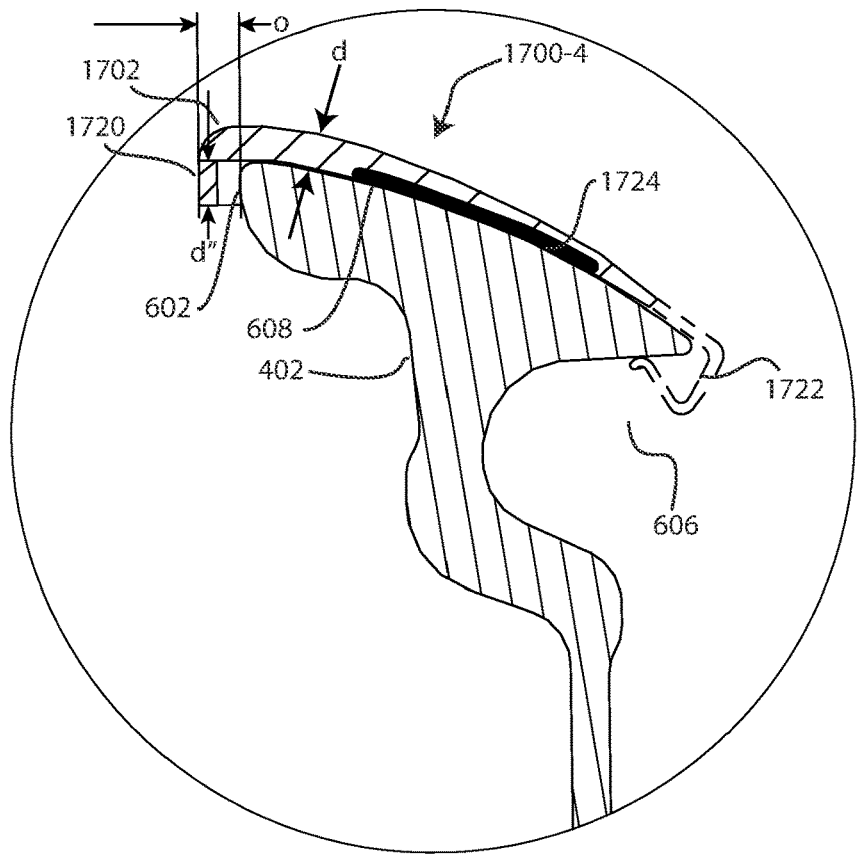
FIG. 17B is an enlargement of the circled portion of FIG. 17A.

FIG. 17A is a sectional view for FIG. 4 taken through section A-A with an alternative embodiment of the segmented wheel protector installed. FIG. 17A shows the relationship between the interspoke portion of segment 1700-4 and the rim 602 of wheel 402. FIG. 17B is an enlargement of the circled portion of FIG. 17A. The main differences between segment 1700 and segment 100 is that rather than having a lip that engages the wheel, segment 1700 distal edges merely extends flush with or beyond the wheel edge 602 and may terminate in an overhang 1720. Some embodiments of segment 1700 may omit the hook 1722. When present hook 1722 clamps to the wheel 402 with the free end of the hook 1722 residing in inner recess 606 of wheel 402. When present, hook 1722 can be substantially as described above with reference to hook 222.

As noted above, distal edge 1702 extends flush with or beyond the rim edge 602 of the wheel 402 such that the radius of the distal edge 1702 distance o greater than or equal to the radius of the wheel 402. Distance o is expected to be in the range of 0-8 mm. Distal edge 1702 may have an overhang 1720 that extends a distance d" beyond the rim edge 602. The distance d" can be in the range of 0-10 mm. That is, at the limit, no overhang exists. When present the overhang 1720 helps to prevent proximal movement of the segment 1700. An additional adhesive layer 1724 adheres to interspoke wheel surface 608 and cements the segment 1700-4 to the wheel 402. In embodiments without the hook 1722, the adhesive is the dominant holding force that retains the segment 1700 on the wheel 402.

FIG. 18 is a rear perspective view of a segmented wheel protector according to another alternative embodiment of the invention. The embodiment of FIG. 18 is, in most respects, similar to the embodiment described above with reference to FIGS. 1-3. Segment 1800 has an arcuate distal edge 1802 with a radius only slightly larger than the radius of the wheel on which it is intended to be used. The segment 1800 also has an arcuate proximal edge 1804 with a radius less than the radius of the distal edge 1802.

Distal edge 1802 forms a lip 1820 that, in use, engages the rim of the wheel to hold the segment 1800 in place. Distal edge 1802 has an interspoke section 1812 and an over spoke section 1814. The over spoke section 1814 terminates in a tapered end 1816 configured to underlie an interspoke section of an adjacent segment when installed. In some embodiments, an extension 1842 extend from lip 1820 and terminate in a protrusion such as tine 1840. As described in greater detail below. Tine 1840 provides a pinch point with a tire reducing the risk that the segment 1800 will dislodge in an impact event. In some embodiments, segment 1800 defines a pry groove 1850 that facilitates removal of the segment 1800 when desired. In some embodiments, pry groove 1850 is hidden within lip 1820 so as not be readily visible when the segment is installed.

Proximal edge 1804 defines a hook 1822 that engages an inner wheel recess to retain the segment 1800 on the wheel. In some embodiments, hook 1822 has a relatively narrow mouth 1832 and a wider bottom 1834. This allows the hook 1822 to better engage the inner recess of the wheel. The mouth width is selected to be slightly smaller than the proximal interspoke thickness of the wheel. The depth of the hook (distance from mouth to bottom) is selected to accommodate manufacturing variance in wheel. Wheel geometries for the same types of wheels can vary by as much as 5 mm. The resilience of the mouth and the hook depth accommodates these variances and provides firm engagement.

To install a segment 1800, hook 1822 is first engaged in the inner wheel recess between a pair of adjacent spokes. Then the lip 1820 is snapped over the rim of the wheel. The snap fit ensures easy installation and secure retention of the segment 1800. Subsequent segments are snapped in place with the respective notch 1818 of the current segment 1800-$n$+1 overlying the tapered end 1816 of the immediately adjacent segment 1800-$n$. For the final segment the tapered end 1816 of segment 1800 is inserted beneath its prospective adjacent segment before the lip is snapped over the rim and tapered end of the other immediately adjacent segment.

The segment 1800 has a first spoke adjacent edge 1806 and a second spoke adjacent edge 1808. The body 1810 of the segment 1800, when installed resides between two spokes of a wheel such that the spoke adjacent edges near two immediately adjacent spokes. To facilitate installation, the wheel facing surface of the body 1810 is formed with a region having a ribbed profile 1852. The ribbed profile 1852 is generally centrally located on the body 1810. The ribbed profile provides greater flexibility of the body 1810 without thinning the entire body 1810, which would otherwise result in weaker protection for the wheel. In some embodiments, body 1810 has a surface profile that closely matches the profile of the underlying wheel. In some embodiments there are an equal number of spokes and segments 1800. In some embodiments all segments 1800 are substantially identical except one that differs only in that it defines a bore (not shown in this drawing) to accommodate a valve stem of a tire on the wheel.

Segment 1800 may be formed of polycarbonate, acrylonitrile butadiene styrene (ABS), or other suitable synthetic materials. ABS has desirable strength and flexibility characteristic for use as a wheel protector. ABS can be produced in different colors easily. Segment 1800 may be injection molded or otherwise formed as a single integral unit. In some embodiments, the ABS may be painted or coated to more closely match the color to the wheel on which it will be used or any desired color. In other embodiments colorant may be added during molding so that the segment 1800 has a desired color without further processing. By matching the color of the wheel, the segments remain unobtrusive. Some users may instead want to dress up their wheels with more vibrant colors. Any coloration is deemed within the scope of embodiments of the invention.

In some embodiments, the wheel facing surface 1810 may have an adhesive region 1824 thereon to further secure the segment when installed. Some embodiments may have an additional adhesive region 1826 within the over spoke section 1814. One embodiment uses VHB-5925 double sided foam tape commercially available from 3M Corporation of St. Paul Minnesota. Foam tape has the advantage of absorbing dimensional differences between the segment 1800 and the wheel. Other embodiments may use other pressure sensitive adhesives. The adhesive further cements the segment to the wheel. This is particularly beneficial where multiple impact events may occur to a segment 1800 before the segment 1800, or the whole wheel protector is replaced. Testing has shown that with adhesive layer a segment cracked or damaged by an impact event will generally remain on the wheel.

Figure 20:
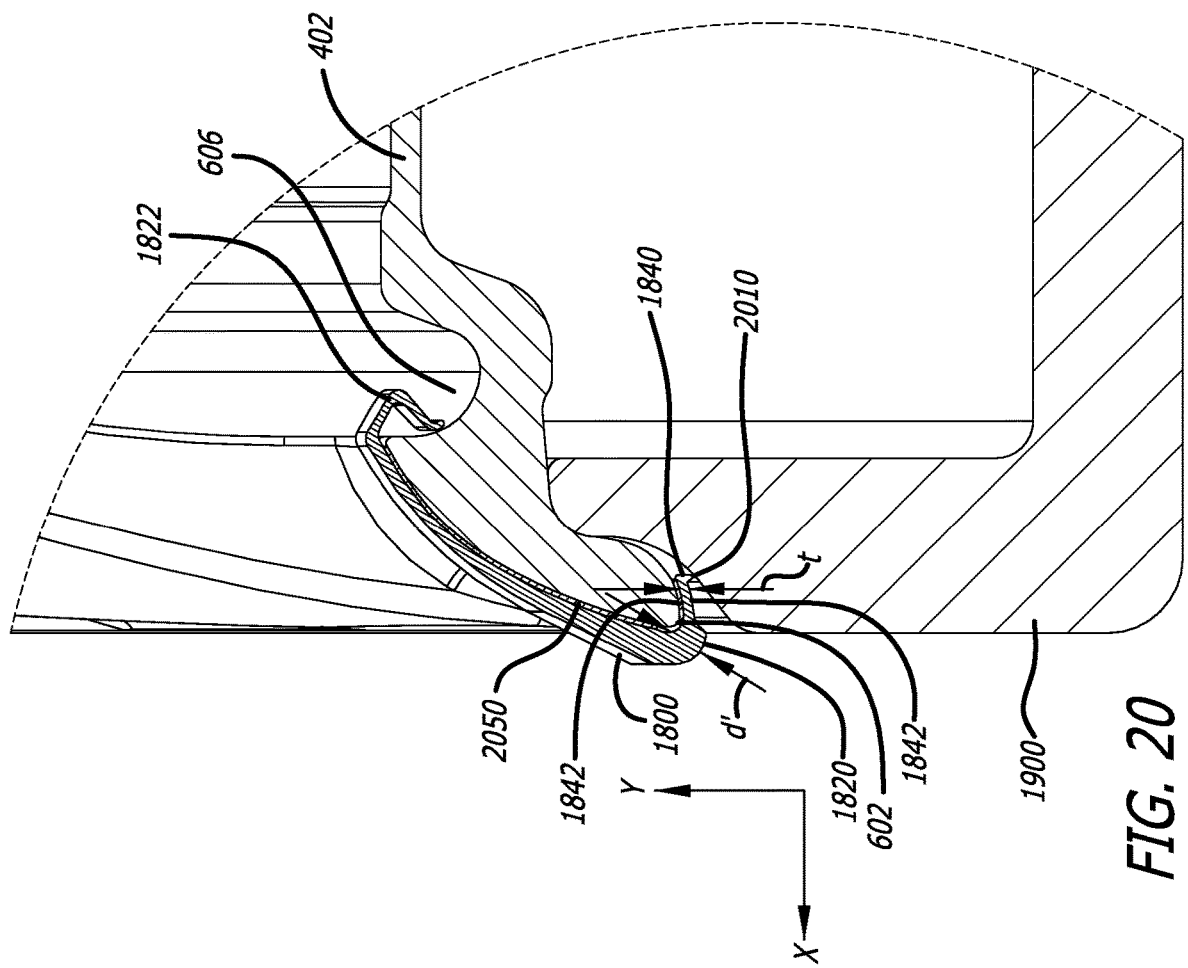
FIG. 20 is a magnified partial section view of the region identified in FIG. 19 when the tire is in an uncompressed state.
Figure 19:
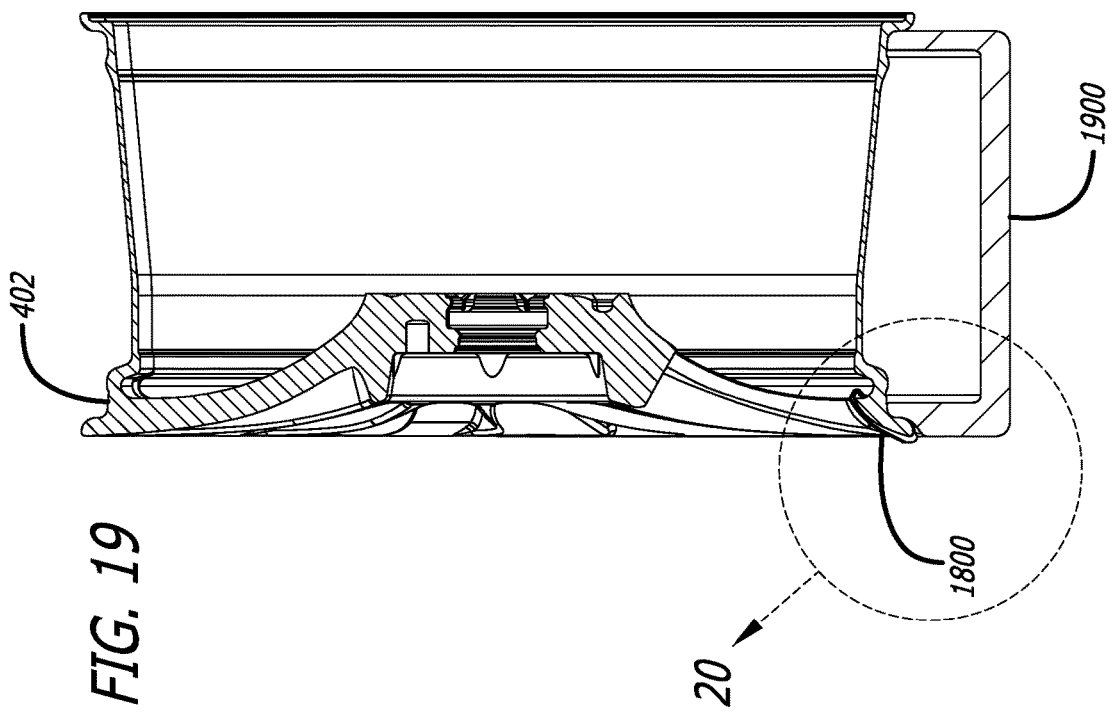
FIG. 19 is a sectional view of the segment of FIG. 18 installed on a wheel.

FIG. 19 is a sectional view of the segment of FIG. 18 installed on a wheel. Wheel 402 has a tire 1900 installed thereon. FIG. 20 is a magnified partial section view of the region identified in FIG. 19 when the tire is in an uncompressed state.

Hook 1822 clamps to the wheel with the free end of the hook residing in inner recess 606 of wheel 402. Lip 1820 of distal edge 102 snap fits over the rim 602 of the wheel 402. The rim edge 602 rolls off in an arc. To remain firmly attached lip 1820 must snap in below edge 602. That is the distal edge 1802 extends marginally further from the axis of rotation of the wheel than edge 602 and lip 1820 engages the wheel 402 nearer the axis of rotation than edge 602. The elastic properties of the material forming the segment, e.g., polycarbonate, ensure a stable attachment. In one embodiment, extension 1842 has a thickness t less than the thickness d' of the lip 1820. Thicknesses of the lip 1820 and other parts of segment 1800 may be the same as described above in connection with other embodiments.

Furthermore, extension 1842 is formed to be a length such that tine 1840 resides very close or preferably in contact with tire 1900 when the segment 1800 is installed on wheel 402. It has been found that in some impact events, deformation of the tire 1900 imparts significant force in the x direction on the lip that, in some instances, can dislodge a segment and reduce the effective protection provided by the wheel protector.

Figure 21:
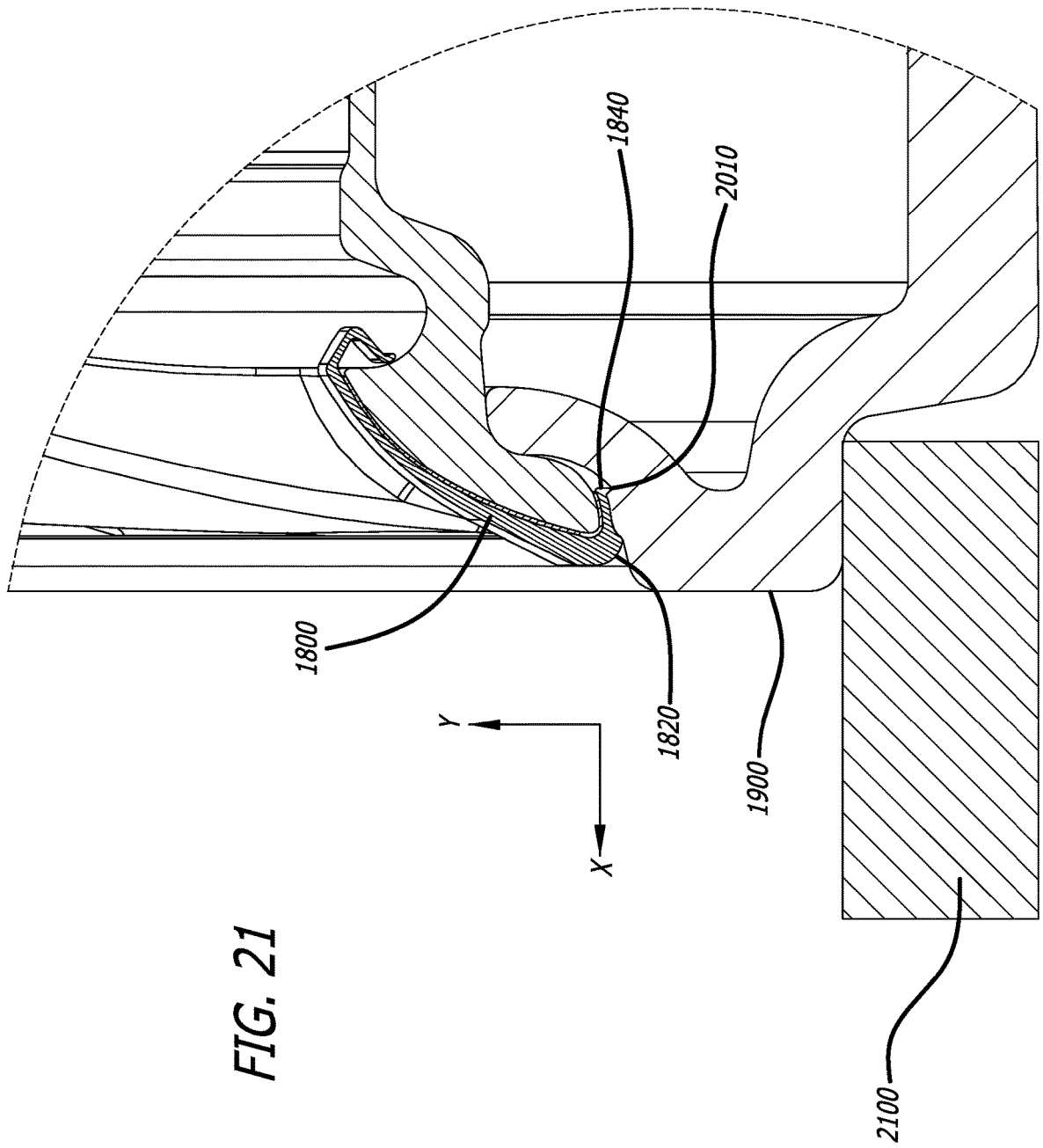
FIG. 21 is a magnified partial section view of the region identified in FIG. 19 when the tire is a compressed state.

FIG. 21 is a magnified partial section view of the region identified in FIG. 19 when the tire is in a compressed state. When an impact event between an object 2100, for example a curb the tire 1900 deforms. It has been found that having tine 1840 immediately adjacent to, or in contact with, the tire results in a pinch point 2010. That is, the deformation of the tire pinches the tine in the y direction before the deformation applies a force in the x direction on the lip 1820. The pinch at the pinch point 2010 prevents the x directed force from dislodging the segment 1800.

Figure 23:
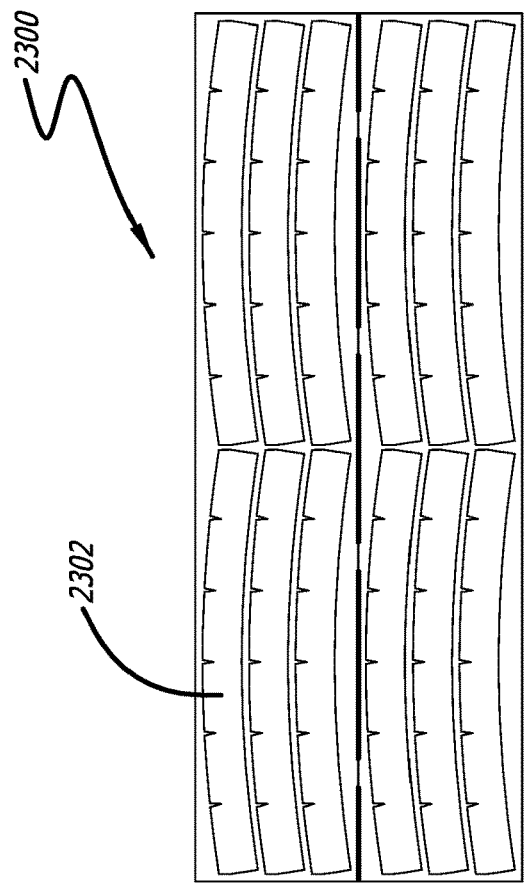
FIGS. 22-23 are film sheets for use with one embodiment of the invention.
Figure 22:
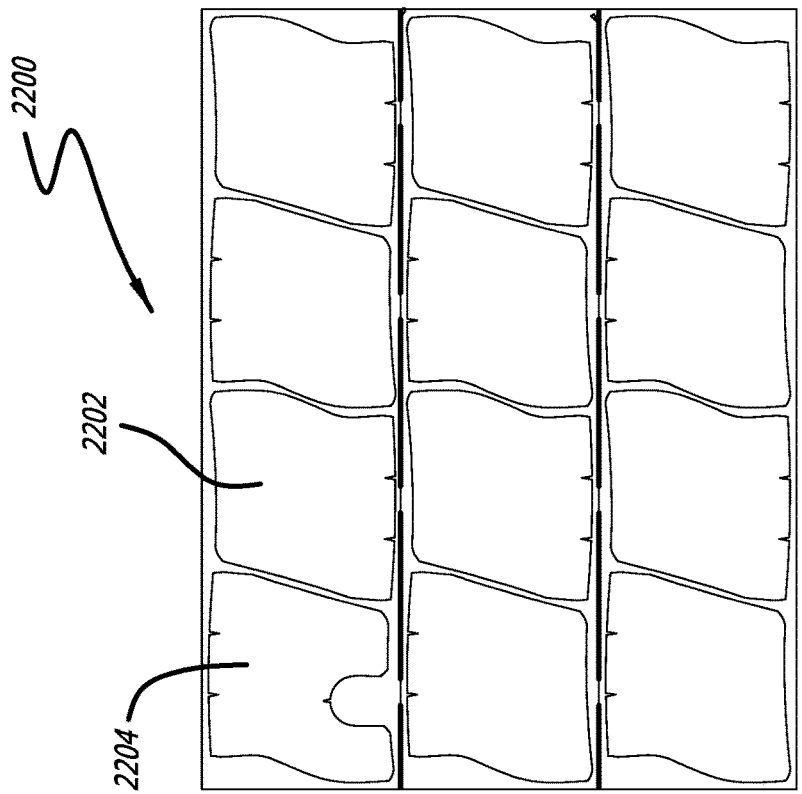

FIGS. 22-23 are film sheets for use with one embodiment of the invention. It has been found that in some cases, particulate matter, such as sand, grit or the like, will collect inside the segments during use. This can scratch the wheel finish and lead to undesirable cosmetic appearance when the wheel protector is removed. By applying a single sided adhesive film to the wheel before installing the segments, such cosmetic defects can be eliminated. In some embodiments, a sheet 2200 of interspoke film inserts 2202 may be included with a set of segments. In some embodiments, a valve film insert 2204 may be included to accommodate the valve of wheel 402. In some embodiments, a second sheet 2300 of distal edge film inserts 2302 may also be provided. In some embodiments, the film insert 2202, 2204, 2302 are adhered to the wheel by a single sided adhesive before the segments are installed on the wheel. In one embodiment, the film may be formed of a thermoplastic polyurethane (TPU) with optically clear adhesive.

Figure 24:
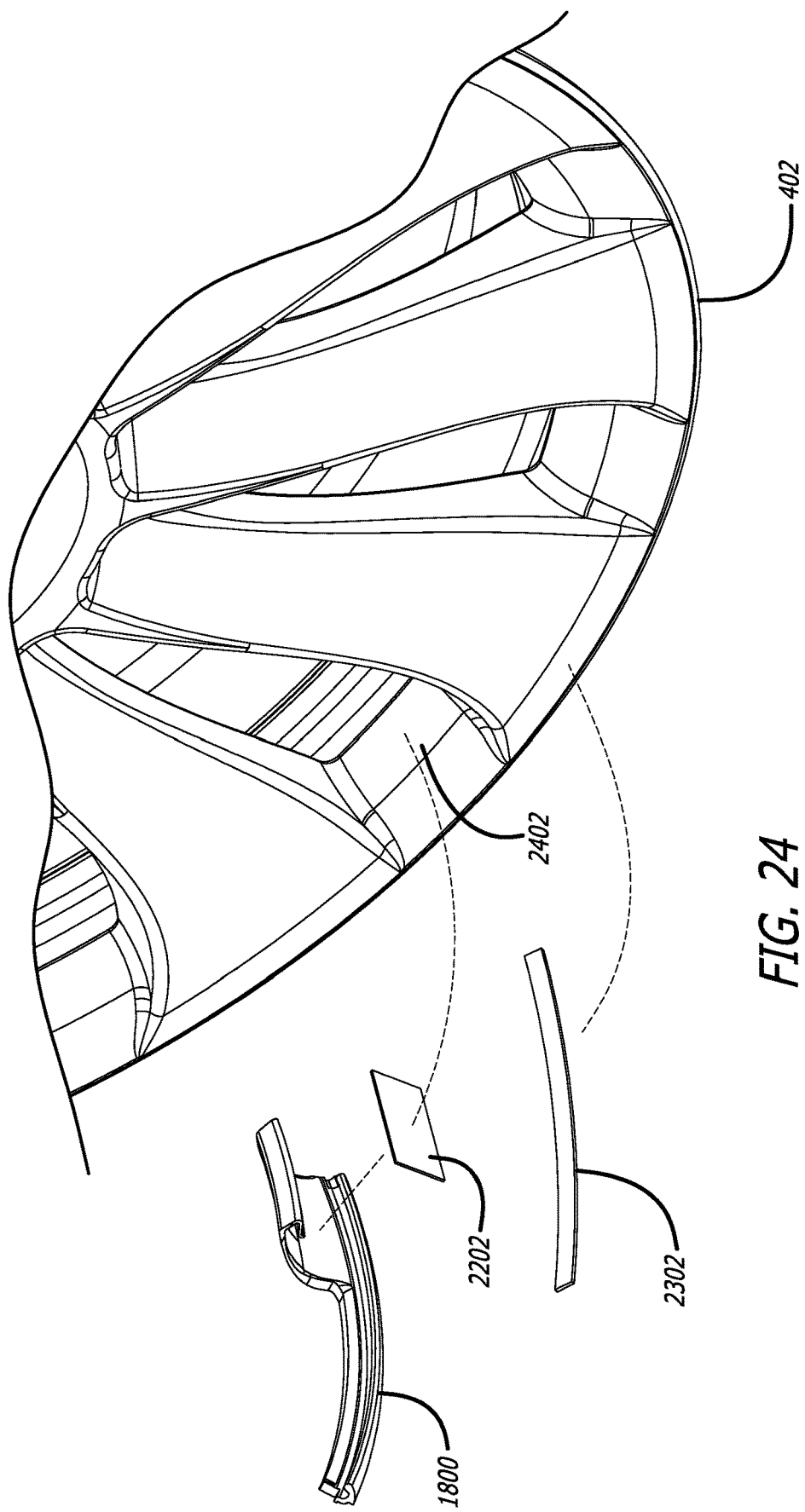
FIG. 24 is an exploded view of a segment, film inserts and wheel according to one embodiment of the invention.

FIG. 24 is an exploded view of a segment, film inserts, and wheel according to one embodiment of the invention. Interspoke film insert 2202 adheres to interspoke wheel surface 2402. Distal edge film insert 2302 adhere along the distal edge of wheel 402 to underly the segment 1800 adjacent to the distal edge along its entire length. The segment 1800 can then be snapped over the film insert. If adhesive regions are present they will adhere to the underlying film inserts. In any case, the wheel is protected from abrasion by particulate matter that infiltrates the wheel protector during use.

It should be understood that the embodiments of FIGS. 1-17B could be formed to include an extension and protrusion as described with reference to FIG. 18. Furthermore any of the embodiment can be used with underlying film inserts to further protect the wheel from abrasion.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A protector for a wheel comprising:
   a first segment of synthetic material having an arcuate distal edge of a first radius, the distal edge forming a lip to extend beyond a distal edge of the wheel, the first segment having at least two spoke adjacent edges and an extension extending from the lip beyond the distal edge of the wheel and forming a protrusion, the protrusion dimensioned to form a pinch point when the segment is installed and a tire installed on the wheel is compressed; and
   a second segment of synthetic material having an arcuate distal edge of the first radius, the distal edge forming a lip to extend beyond the distal edge of the wheel, the second segment having at least two spoke adjacent edges and an extension extending from the lip beyond the distal edge of the wheel and forming a protrusion that forms a pinch point when the segment is installed, and the the tire is compressed;
   wherein, collectively, the arcuate distal edge of the first segment and second segments covers at least one spoke and at least one interspoke section at the distal edge of the wheel during use.

2. The protector of claim 1 wherein each segment has an arcuate proximal edge with a second radius less than the first radius and defining a hook to engage an inner recess of the wheel.

3. The protector of claim 1 further comprising:
   a plurality of additional segments substantially identical to one of the first segment or the second segment, the plurality in conjunction with the first segment and second segment collectively covering 360° of the distal edge of the wheel.

4. The protector of claim 1 wherein each segment further comprises:
   an adhesive region on a wheel facing surface of the segment.

5. The protector of claim 1 wherein each segment snap fits onto the wheel without additional mechanical connectors.

6. The protector of claim 1 wherein each segment defines a prybar slot adjacent to the distal edge.

7. The protector of claim 1 wherein the spoke adjacent edges of one segment are adjacent to opposite edges of a single spoke.

8. The protector of claim 1 wherein the spoke adjacent edges of one segment are adjacent to facing edges of two different spokes.

9. The protector of claim 1 wherein the first segment has a portion configured to engage the rim edge and to reside between a first and a second spoke of the wheel and a portion to overlie an edge of the wheel substantially coextensive with the first spoke.

10. The protector of claim 9 wherein a portion of the first segment tapers at a first end to underlie at least a portion of the second segment adjacent to the first end.

11. The protector of claim 1 wherein at least a portion of a region between the spoke adjacent edges has a ribbed cross section.

12. An apparatus comprising:
    a wheel; and
    a protector for the wheel including:
    a first segment of synthetic material having an arcuate distal edge of a first radius, the distal edge forming a lip to engage a distal edge of the wheel, the first segment having at least two spoke adjacent edges and an extension extending from the lip beyond the distal edge of the wheel and forming a protrusion, the protrusion dimensioned to form a pinch point when the segment is installed and a tire installed on the wheel is compressed; and
    a second segment of synthetic material having an arcuate distal edge of the first radius, the distal edge forming a lip to engage the distal edge of the wheel, the second segment having at least two spoke adjacent edges and an extension extending from the lip beyond the distal edge of the wheel and forming a protrusion that forms a pinch point when the segment is installed, and the tire is compressed;
    wherein, collectively, the arcuate distal edge of the first segment and second segments covers at least one spoke and at least one interspoke section at the distal edge of the wheel during use.

13. The apparatus of claim 12 further comprising:
    a film layer coupled between the wheel and the segments.

14. The apparatus of claim 12 wherein at least a portion of a region between the spoke adjacent edges of each segment has a ribbed cross section.

15. A protector for a wheel comprising:
    a first segment of synthetic material having an arcuate distal edge of a first radius, the first radius equal to or greater than a radius of a distal edge of the wheel, the first segment having at least two spoke adjacent edges, the first segment couplable to a wheel such that the distal edge, when installed covers at least one spoke and at least one interspoke section; and
    a second segment of synthetic material having an arcuate distal edge of the first radius, the first radius equal to or greater than a radius of a distal edge of the wheel, the second segment having at least two spoke adjacent edges, the second segment couplable to a wheel such that the distal edge, when installed covers at least one spoke and at least one interspoke section;
    wherein each spoke adjacent edge is configured to reside within 0-7 mm of a spoke of the wheel.

16. The protector of claim 15 further comprising:
    an extension extending from the distal edge of the first segment beyond the distal edge of the wheel and forming a protrusion that forms a pinch point when the segment is installed, and a tire installed on the wheel is compressed; and an extension extending from the distal edge of the second segment beyond the distal edge of the wheel and forming a protrusion that forms a pinch point when the segment is installed, and the tire is compressed.

17. The protector of claim 15 further comprising:

a plurality of additional segments substantially identical to one of the first segment or the second segment, the plurality in conjunction with the first segment and second segment collectively covering 360° of the distal edge of the wheel.

* * * * *